United States Patent [19]

Boyd et al.

[11] Patent Number: 5,727,396
[45] Date of Patent: Mar. 17, 1998

[54] METHOD AND APPARATUS FOR COOLING A PRIME MOVER FOR A GAS-ENGINE DRIVEN HEAT PUMP

[75] Inventors: Douglas E. Boyd, Dublin; Jan B. Yates, Reynoldsburg, both of Ohio

[73] Assignee: Gas Research Institute, Chicago, Ill.

[21] Appl. No.: 573,154

[22] Filed: Dec. 15, 1995

[51] Int. Cl.⁶ .......................... F25B 27/00; G05D 23/00
[52] U.S. Cl. .................... 62/323.1; 62/238.6; 62/324.1; 237/2 B
[58] Field of Search .................... 62/323.1, 238.6, 62/238.7, 324.1; 237/2 B

[56] References Cited

U.S. PATENT DOCUMENTS

| | | | |
|---|---|---|---|
| 4,697,434 | 10/1987 | Yuyama | 62/238.7 |
| 4,754,614 | 7/1988 | Yuyama | 62/238.6 |
| 4,976,464 | 12/1990 | Swenson | 237/81 |
| 5,000,011 | 3/1991 | Hayakawa | 62/324.1 |
| 5,020,320 | 6/1991 | Talbert et al. | 62/238 |
| 5,099,651 | 3/1992 | Fischer | 62/79 |
| 5,192,022 | 3/1993 | Swenson | 237/2 B |
| 5,226,594 | 7/1993 | Swenson | 237/2 B |
| 5,243,825 | 9/1993 | Lin | 62/238.7 |
| 5,253,805 | 10/1993 | Swenson | 237/2 B |

FOREIGN PATENT DOCUMENTS

| | | | |
|---|---|---|---|
| 3314276 | 10/1984 | Germany | 62/323.1 |
| 2160966 | 1/1986 | United Kingdom | 62/323.1 |

*Primary Examiner*—William Doerrler
*Attorney, Agent, or Firm*—Dick and Harris

[57] ABSTRACT

A method and apparatus for providing cooling for the prime mover for a gas powered heat pump system, which is operably configured to provide cooling for the prime mover without additional equipment or losses in heating capacity or efficiency. The method and apparatus of the present invention advantageously utilizes the residential or structural hot water system for removal of heat from the prime mover and delivery of that heat to the indoor heat exchanger and/or domestic hot water tank for the heat pump system.

14 Claims, 1 Drawing Sheet

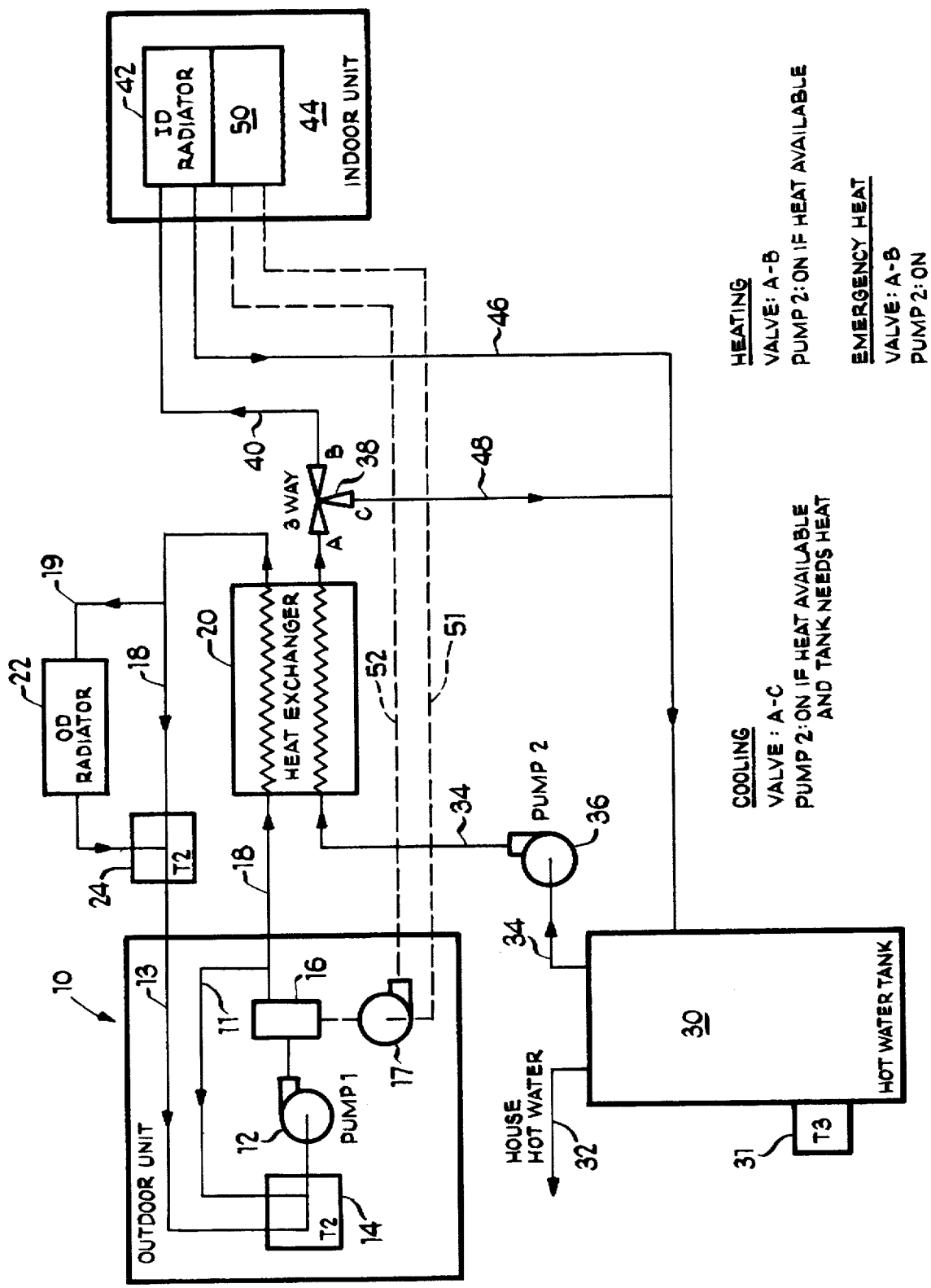

METHOD AND APPARATUS FOR COOLING A PRIME MOVER FOR A GAS-ENGINE DRIVEN HEAT PUMP

BACKGROUND OF THE INVENTION

1. Field of the Invention

The present invention relates to heat pump systems for the thermal conditioning of spaces. In particular, the present invention relates to heat pump systems which employ a gas-engine as a prime mover for the heat pump.

2. The Prior Art

In prior art gas-engine driven heat pump systems, when the heat pump is operating in the heating mode, the heat pump utilizes the engine coolant to reject excess engine heat (which would otherwise be "waste heat") to the space which is being conditioned. In typical prior art installations, this is accomplished by running two coolant lines from an outdoor unit which typically houses the gas engine and associated components, to a heat exchanger which is located in the top of the indoor heat exchanger for the heat pump system.

When such a gas-engine driven heat pump is installed in a situation in which the outdoor unit is, for example, mounted on a slab at a location outside of the residence or other structure, and the coolant lines must run upwardly from the outdoor unit, or in any similar installation, in which the indoor unit is significantly elevated relative to the outdoor unit, there is the possibility that the coolant pump, which is situated in the outdoor unit, may not be sufficiently powerful to develop enough pressure (head) to reliably pump the coolant to the indoor unit. This potential problem is particularly critical when the gas engine is operating at low speeds, since the coolant pump, which is typically driven by the gas engine as an auxiliary unit, is also running at low speed.

Typical prior art attempts to solve this problem have involved either supplying a higher head electric coolant pump (which consumes additional electricity, and increases the overall cost of operation of the heat pump system), or running the coolant lines for the engine to an outdoor radiator, to "dump" the heat to outdoor air (decreasing the total amount of heat being delivered to the space and likewise reducing the overall efficiency of the system).

The fundamental problem which must be overcome, with high elevation changes in a coolant circuit, involve the purging of the system. Although hydronic type plumbing circuits exist which can pump water over significant changes in elevation, such circuits employ automatic purge valves which ensure that the water lines remain free of air. However, non-hydronic circuits, such as are used for the coolant lines for a gas engine for a heat pump may have large pressure fluctuations, which make the use of automatic purge valves inappropriate. For example, the pressure of the coolant system for the gas engine may vary from 7 psig when hot (running) to 0 psig when cold (not running). This translates to a variation of 0 psig to −7 psig at the top of the coolant line, for example, running through an attic at an elevation of up to 16 feet above the outdoor unit.

It would be desirable to provide a way to reliably transfer the "waste heat" from a gas engine for a heat pump, to the interior space to be conditioned, during heating operations, without unnecessarily adding to the cost or complexity of the heat pump system.

SUMMARY OF THE INVENTION

The present invention is directed to an apparatus for providing cooling for a prime mover for a gas powered heat pump system, for a structure, at least a portion of the interior space of which is to be thermally conditioned, the heat pump system including at least one indoor heat delivery exchanger situated in the portion of the interior space to be thermally conditioned, the structure further having a domestic hot water circulating system, including a hot water storage tank.

The apparatus for providing cooling for a prime mover for a gas powered heat pump system comprises a heat exchanger; means for delivering coolant from the prime mover to the heat exchanger; means for delivering water directly from the hot water storage tank to the heat exchanger; an indoor radiator situated in the portion of the space to be thermally conditioned; means for selectively directing the flow of water from the heat exchanger. The means for selectively directing flow is operably configured to direct the flow of water to the indoor radiator or directly back to the hot water tank.

The apparatus further comprises means for returning the coolant from the heat exchanger to the prime mover. The means for returning the coolant comprises a further, externally situated radiator operably interposed between the heat exchanger and the prime mover, and operably disposed in a fluid circuit with the prime mover and the heat exchanger, at a position downstream of the heat exchanger.

In a preferred embodiment of the invention, the means for delivering coolant from the prime mover to the heat exchanger comprises a pump operably disposed in a fluid circuit with the prime mover and the heat exchanger, at a position upstream of the heat exchanger. The invention further comprises means for returning water from the indoor radiator to the hot water tank.

The apparatus further comprises means for returning water directly from the heat exchanger to the hot water tank.

The means for selectively directing flow preferably further comprises a three-way valve.

The present invention is also directed to a method for providing cooling for a prime mover for a gas powered heat pump system, for a structure, at least a portion of the interior space of which is to be thermally conditioned, the heat pump system including at least one indoor heat delivery exchanger situated in the portion of the interior space to be thermally conditioned, the structure further having a domestic hot water circulating system, including a hot water storage tank.

The method for providing cooling for a prime mover for a gas powered heat pump system comprising the steps of:

delivering coolant from the prime mover to a heat exchanger, when the coolant has exceeded a predetermined maximum temperature;

delivering water directly from the hot water storage tank to the heat exchanger;

prompting the exchange of heat from the coolant to the water from the hot water storage tank;

selectively delivering the heated water from the heat exchanger to an indoor radiator situated in the portion of the interior space to be thermally conditioned;

alternatively selectively delivering the heated water directly back to the hot water tank.

The method further comprises the step of returning the coolant from the heat exchanger to the prime mover.

The method further comprises the step of directing the coolant through a further, externally situated radiator operably interposed between the heat exchanger and the prime mover and downstream of the heat exchanger, for rejecting undesired excess heat not transferred to the water in the heat exchanger.

The method further comprises the step of returning water from the indoor radiator to the hot water tank. The method further comprises the step of returning water directly from the heat exchanger to the hot water tank.

BRIEF DESCRIPTION OF THE DRAWINGS

FIG. 1 is a schematic illustration of the cooling apparatus for a gas engine heat pump system, according to the present invention.

BEST MODE FOR CARRYING OUT THE INVENTION

While this invention is susceptible of embodiment in may different forms, there is shown in the drawings and will be described herein in detail, a specific embodiment, with the understanding that the present invention is to be considered as an exemplification of the principles of the invention, and is not intended to limit the invention to the embodiment illustrated.

FIG. 1 illustrates schematically the method and apparatus for cooling a gas engine for a heat pump, according to a preferred embodiment of the present invention. A suitable control device, such as a microprocessor, a PC-based controller, or even a suitable programmable thermostat may be provided. Such a control device may be configured to commonly control most, if not all of the components of the heat pump system, and may even be configured to control the heater for the domestic hot water system, as discussed hereinafter. Such a control device may be of otherwise conventional configuration, and so has been omitted from the drawings for simplification of the illustration.

Outdoor unit 10 for a heat pump system includes a coolant pump 12 and a thermostat/valve 14. The engine 16 and related accessories may be of otherwise conventional configuration, and accordingly the specific details of the engine 16 and related accessories have been omitted from the illustration, as being understood by one having ordinary skill in the art and having the present disclosure before them. Likewise, the various other components of the heat pump system (e.g., heat exchangers, valves, piping, etc.) may be of known configuration, the present invention being directed to the cooling of the prime mover (gas engine) of the heat pump system. For example, heat pump system components which may be powered by engine 16, are shown in broken lines, and may include compressor 17 (which takes its motive power, e.g., via a shaft, from engine 16), indoor heat exchanger 50 (which may be in indoor unit 44), and conduits 51, 52, which lead between compressor 17 and heat exchanger 50. However, the heat pump system components are shown merely by way of example, and other configurations may be used without departing from the scope of the present invention. While, in a preferred embodiment of the invention, pump 12 will be situated upstream relative to gas engine 16, as illustrated, in an alternative embodiment, pump 12 may be situated downstream relative to gas engine 16.

Upon exiting pump 12, the coolant is directed via a line 18 to a heat exchanger 20. Thermostat/valve 14 can receive, in addition to the liquid exiting thermostat/valve 24, a portion of the liquid exiting pump 12, so that the liquid entering engine 16 can be a mixture of the two, potentially varying between one hundred percent "fresh" liquid exiting from thermostat/valve 24 (line 13), to one hundred percent completely recirculated liquid (line 11). Coolant line 18 exits heat exchanger 20, and passes to an outdoor radiator 22. In a preferred embodiment of the invention, heat exchanger 20 will be located within the residence or other structure, and will be located at an elevation which is substantially the same as the outdoor unit 10. In fact, since the present invention utilizes the household hydronic system, heat exchanger 20 may even be situated at an elevation which is below that of the outdoor unit 10. Thermostat/valve 24 is positioned downstream of outdoor radiator 22 and connects lines 18 and 19. If the temperature of the coolant bypassing outdoor radiator 22 is too high (according to the specifications and requirements of the particular gas engine), thermostat/valve 24 blocks line 18 and causes the coolant to proceed through line 19, so that any excess heat is transferred to outdoor air.

A household hot water system includes hot water tank 30, from which the household potable hot water is supplied at 32. Tank 30 may be an otherwise conventional water heater, having its own dedicated burner heat source (not shown). Tank 30 typically will be provided with its own thermostat $T_3$, which senses the temperature of the water in the tank, and controls the operation of the dedicated burner for tank 30. Line 34 exits hot water tank 30 and proceeds to pump 36. From pump 36, the hot water line 34 passes through heat exchanger 20 and onto three-way valve 38, having ports A, B and C. From port B, line 40 proceeds onward to an indoor radiator 42, which is located in the indoor unit 44 of the heat pump system, and which is preferably situated adjacent the heat pump heat exchanger, so that the heat being delivered by line 40 is added to the heat being supplied from the heat pump heat exchanger (not shown), thereby utilizing the heat from the gas engine and enhancing the overall efficiency of the system.

Preferably, the heat pump system will be calibrated to operate in a coordinated manner with the engine cooling system as well as the domestic hot water system, so that the heat from the domestic hot water tank and the heat being provided by the heat pump, together or separately, may be used to meet the heating requirements placed on the overall system by the household thermostat, etc., if necessary or desired. For example, during periods of very low heating requirements, the heat may be obtained solely from the heat in the water from the domestic hot water tank. Engine 16, during such periods, might not be running, and in such case, no significant heat transfer will be taking place in heat exchanger 20. Such operations may typically take place, for example, during early Fall (e.g., temperatures of +50° F.). By utilizing the heat from the domestic hot water (typically for very brief periods in the early a.m.), the gas engine 16 can be spared from such short cycling duty, which is typically detrimental to such engines.

The overall system also may be configured such that during periods of normal heating requirements (temperatures of around 30° F.), the heat pump (and gas engine) may be run and heat may be obtained from both the heat pump refrigerant circuit, as well as from the waste heat from the gas engine. The control device for the system (such as a microprocessor or programmable thermostat, etc., not shown, but which may be of otherwise conventional configuration) will be suitably programmed so as to switch between such modes of operation, based, at least in part, upon such parameters as the external temperature conditions (through suitably provided sensors) and the operational characteristics (e.g., the operational efficiencies, etc.) of the individual components of the overall system and so may vary from individual application to individual application, but will be readily determinable by one of ordinary skill in the art having the present disclosure before them.

From indoor radiator 42, line 46 returns the water to the hot water tank 30. From port C, line 48 joins line 46.

If the system is operating in the heating mode, and there is no need for heat to be provided to the domestic hot water tank 30, valve 38 (which may be a three-way solenoid-driven valve, or other suitable valve which may be of otherwise known configuration) will be placed in the configuration so that ports A and B are connected. Heated water will be directed through line 40 to supply heat to the indoor space at 44, as previously described. If the system is operating in the heating mode, and there is a need for heat to be provided to the domestic hot water tank 30 (i.e., tank thermostat $T_3$) indicates that the tank water temperature has dropped below a desired temperature $T_a$, then valve 38 will be placed in the configuration so that ports A and C are connected. Heated water will then be directed through line 48, back to tank 30, so that the heat will be added to tank 30 until a desired temperature ($T_b$, which typically will be greater than $T_a$) is attained. Pump 36 will be operated, as required, to take heat from heat exchanger 20, so that heat can be obtained from the gas engine 16 to supply heat to either the space (at indoor radiator 42) or to the domestic hot water tank 30.

It has been observed that in view of the typical thermal efficiency of a conventional water heater, such as tank 30 (typically approximately 75%), that under certain operating conditions, it may be more efficient, for the operation of the overall system, that the domestic water supply be heated primarily from heat from gas engine 16, rather than from the dedicated burner of the tank 30. Accordingly, the control device for the overall system may be configured so as to give priority to using the waste heat from the gas engine to heat the domestic water instead of using that waste heat to supplement the heat to the space which is being provided by the heat pump itself, even though this means that the heat pump itself may have to run longer, to satisfy the indoor space heating requirements. Therefore, the control device may be configured so as to ensure that when the tank thermostat 31 calls for heat, instead of (or in addition to) firing the dedicated burner for tank 30, valve 38 will be set to return water heated in exchanger 20 to tank 30, until the heating requirements set by thermostat 31 are satisfied, before rerouting the heated water to indoor radiator 42.

If the system is in the cooling mode, then valve 38 will be placed in the configuration so that ports A and C are connected, and the water which has been heated in heat exchanger 20 will be circulated back to hot water tank 30, to replace heat lost from water which has been consumed at 32, or which has cooled, such as from standby losses. Pump 36 will be actuated to supply hot water tank 30 with hot water, only when thermostat 31 on tank 30 indicates that additional hot water is required. Since heat exchanger 20 may also be utilized to heat the water for the domestic supply, pump 36 may operate during both heating and cooling modes.

Domestic water pump 36 can also be configured to activate whenever the heat pump system needs backup or auxiliary heat. In this mode, engine coolant and water tank heat would be supplied to the house via the indoor unit, and pump 36 would be operated as needed, until the period of auxiliary or backup heating requirements has passed.

The method and apparatus for cooling the prime mover of a gas-engine driven heat pump system, according to the present invention would allow a gas engine driven heat pump to be installed at slab or other "high-head" types of installations without an increase in parasitic apparatus (high head pumps) or a loss of overall heating capacity or efficiency.

A further advantage of the method and apparatus of the present system is that due to the capability to route coolant from the gas engine through an outdoor radiator as well as through the heat exchanger 20, at those times when neither the domestic hot water tank nor the indoor space require a heat contribution from the waste heat from the gas engine, the waste heat can be released to the ambient environment, via the outdoor radiator. This permits the heat exchanger 20 to be smaller, if desired, than would otherwise be necessary (in the absence of an outdoor radiator), thus providing a further benefit in terms of reduced equipment size and cost.

Suitable controls will be provided to operate the various valves, pumps, etc., according to known installation and operation techniques known to one of ordinary skill in the art.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. An apparatus for providing cooling for a prime mover for a gas powered heat pump system, for a structure, at least a portion of the interior space of which is to be thermally conditioned, the heat pump system including at least one indoor heat delivery exchanger, configured for receiving therethrough a heat pump system working fluid, situated in the portion of the interior space to be thermally conditioned, the structure further having a domestic hot water circulating system, including a hot water storage tank, the apparatus for providing cooling for a prime mover for a gas powered heat pump system comprising:

a heat exchanger, disposed within the structure;

means for selectively delivering coolant from the prime mover to the heat exchanger;

means for delivering water directly from the hot water storage tank to the heat exchanger, for enabling the water to receive heat from the coolant, when the coolant is passed through the heat exchanger, and, in turn, enabling heat to be removed from the coolant of the prime mover;

an indoor radiator situated in the portion of the space to be thermally conditioned, the indoor radiator being disposed immediately downstream from the heat exchanger;

means for selectively directing the flow of water from the heat exchanger, being operably configured to direct the flow of water either directly to the indoor radiator to enable heating of the space to be thermally conditioned, or directly back to the hot water tank, to enable heating of the water in the domestic hot water system, without utilizing heat from the working fluid of the heat pump system.

2. The apparatus according to claim 1, further comprising means for returning the coolant from the heat exchanger to the prime mover.

3. The apparatus according to claim 2, wherein the means for returning the coolant comprises a further, externally situated radiator operably interposed between the heat exchanger and the prime mover, and operably disposed in a fluid circuit with the prime mover and the heat exchanger, at a position downstream of the heat exchanger.

4. The apparatus according to claim 1, wherein the means for delivering coolant from the prime mover to the heat exchanger comprises a pump operably disposed in a fluid circuit with the prime mover and the heat exchanger, at a position upstream of the heat exchanger.

5. The apparatus according to claim 1 further comprising means for returning water from the indoor radiator to the hot water tank.

6. The apparatus according to claim 1 further comprising means for returning water directly from the heat exchanger to the hot water tank.

7. The apparatus according to claim 6, further comprising means for returning water from the indoor radiator to the hot water tank, the means for returning water from the indoor radiator to the hot water tank further being operably connected to the means for returning water directly from the heat exchanger to the hot water tank.

8. The apparatus according to claim 1 wherein the means for selectively directing flow further comprises a three-way valve.

9. A method for providing cooling for a prime mover for a gas powered heat pump system, for a structure, at least a portion of the interior space of which is to be thermally conditioned, the heat pump system including at least one indoor heat delivery exchanger, for receiving therethrough the working fluid of the heat pump system, situated in the portion of the interior space to be thermally conditioned, the structure further having a domestic hot water circulating system, including a hot water storage tank, the method for providing cooling for a prime mover for a gas powered heat pump system comprising the steps of:

selectively delivering coolant from the prime mover to a heat exchanger, disposed within the structure, when the coolant has exceeded a predetermined maximum temperature;

alternatively recirculating coolant from the prime mover directly back to the prime mover, when the coolant has not exceeded a predetermined maximum temperature;

delivering water directly from the hot water storage tank to the heat exchanger;

prompting the exchange of heat from the coolant to the water from the hot water storage tanks, for enabling the water to receive heat from the coolant, when the coolant is passed through the heat exchanger, and, in turn, enabling heat to be removed from the coolant of the prime mover, for facilitating cooling of the prime mover;

selectively delivering the heated water from the heat exchanger directly to an indoor radiator, disposed immediately downstream from the heat exchanger and situated in the portion of the interior space to be thermally conditioned, to enable heating of the space to be thermally conditioned;

alternatively selectively delivering the heated water directly back to the hot water tank, to enable heating of the water in the domestic hot water system, without utilizing heat from the working fluid of the heat pump system.

10. The method according to claim 9, further comprising the step of: returning the coolant from the heat exchanger to the prime mover.

11. The method according to claim 9, further comprising the step of directing the coolant through a further, externally situated radiator operably interposed between the heat exchanger and the prime mover and downstream of the heat exchanger, for rejecting undesired excess heat not transferred to the water in the heat exchanger.

12. The method according to claim 9, further comprising the step of returning water from the indoor radiator to the hot water tank.

13. The method according to claim 9 further comprising the step of returning water directly from the heat exchanger to the hot water tank.

14. The apparatus according to claim 13, further comprising the step of returning water from the indoor radiator to the hot water tank.

* * * * *